US011630987B2

(12) United States Patent
Qian

(10) Patent No.: US 11,630,987 B2
(45) Date of Patent: Apr. 18, 2023

(54) NEURAL BELIEF REASONER

(71) Applicant: International Business Machines Corporation, Armonk, NY (US)

(72) Inventor: Haifeng Qian, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 994 days.

(21) Appl. No.: 15/966,429

(22) Filed: Apr. 30, 2018

(65) Prior Publication Data
US 2019/0332917 A1 Oct. 31, 2019

(51) Int. Cl.
| G06N 3/04 | (2006.01) |
| G06N 3/08 | (2006.01) |
| G06F 16/903 | (2019.01) |
| G06N 3/088 | (2023.01) |

(52) U.S. Cl.
CPC ........... *G06N 3/0436* (2013.01); *G06N 3/088* (2013.01); *G06F 16/90335* (2019.01)

(58) Field of Classification Search
CPC .................. G06N 3/0436; G06N 3/088; G06F 16/90335
See application file for complete search history.

(56) References Cited

U.S. PATENT DOCUMENTS

| 5,809,212 | A | 9/1998 | Shasha |
| 7,107,254 | B1 | 9/2006 | Dumais |
| 7,742,641 | B2 | 6/2010 | Ivanov et al. |
| 9,443,192 | B1* | 9/2016 | Cosic ..................... G06N 5/048 |
| 9,477,906 | B2 | 10/2016 | Roder et al. |
| 2002/0010691 | A1 | 1/2002 | Chen |
| 2014/0201126 | A1* | 7/2014 | Zadeh ..................... A61B 5/165 |
| | | | 706/52 |
| 2016/0313463 | A1* | 10/2016 | Wahrmund .............. G01V 1/30 |
| 2020/0195663 | A1 | 6/2020 | Achituve et al. |

FOREIGN PATENT DOCUMENTS

| WO | 2012050252 A1 | 4/2012 |
| WO | 2020069051 A1 | 4/2020 |

OTHER PUBLICATIONS

Koulougli ("Handling Query Answering in Crowdsourcing Systems: A Belief Function-Based Approach") (Year: 2016).*
Denoeux1 ("A Neural Network Classifier Based on Dempster-Shafer Theory") (Year: 2000).*
(Continued)

*Primary Examiner* — Kakali Chaki
*Assistant Examiner* — Su-Ting Chuang
(74) *Attorney, Agent, or Firm* — Amin, Turocy & Watson, LLP

(57) ABSTRACT

Technologies for a neural belief reasoner model generative models that specifies belief functions are described. Aspects include receiving, by a device operatively coupled to a processor, a request for a belief function, and processing, by the device, the request for the belief function in the generative model based on trained probability parameters and a minimization function to determine a generalized belief function defined by fuzzy sets. Data corresponding to the generalized belief function is output, e.g., as a belief value and plausibility value.

20 Claims, 9 Drawing Sheets

(56) References Cited

OTHER PUBLICATIONS

Denoeux2 ("Modeling vague beliefs using fuzzy-valued belief structures") (Year: 2000).*
Lefevre ("Using Infomation Criteria in Dempster-Shafer's Basic Belief Assignment") (Year: 1999).*
Rui ("Novel Fuzzy Neural Network: The Vague Neural Network") (Year: 2005).*
Kazemi ("RelNN: A Deep Neural Model for Relational Learning") The Thirty-Second AAAI Conference on Artificial Intelligence (AAAI-18) (Year: 2018).*
Platanios ("Estimating Accuracy from Unlabeled Data") arXiv:1705.07086v1 [cs.LG] May 19, 2017 (Year: 2017).*
Basir ("Connectionist-Based Dempster-Shafer Evidential Reasoning for Data Fusion") IEEE Transactions on Neural Networks, vol. 16, No. 6, Nov. 2005 (Year: 2005).*
Beretta, et al., "How Can Ontologies Give You Clue for Truth-Discovery? An Exploratory Study," 2016, ACM, 12 pages.
Friedman, et al., "Plausibility Measures and Default Reasoning," Journal of the ACM, vol. 48, No. 4, Jul. 2001, pp. 648-685.
Koulougli, et al., "Handling Query Answering in Crowdsourcing Systems: A Belief Function-Based Approach," 2016, IEEE, 4 pages.
Nagy, et al., "Uncertainty Handling in the Context of Ontology Mapping for Question-Answering," Last Accessed: Mar. 21, 2018, 8 pages.
Nagy, et al., "Multi-Agent Ontology Mapping with Uncertainty on the Semantic Web," 2007, IEEE, 8 pages.
Wan, et al., "Query Answering in Belief Logic Programming," Sep. 2009, LNAI 5785, 15 pages.
Zhao, et al., "Uncertainty and Rule Extensions to Description Logics and Semantic Web Ontologies," Advances in Semantic Computing (Eds. Joshi, Boley & Akerkar), vol. 2, pp. 1-22, 2010.
Komatani, et al., "Automatic Allocation of Training Data for Speech Understanding Based on Multiple Model Combinations," IEICE Trans. Inf. & Syst., vol. E95-D, No. Sep. 9, 2012, 10 pages.
Qian, "Fractal Divide and Fractal Aggregation," Proceedings of the 38 th International Conference on Machine Learning, PMLR 139, 2021. Copyright 2021 by the author(s), 9 pages.
Jun. 9, 2021, U.S. Appl. No. 17/343,339.
Chinese Office Action for Chinese Application No. 2019102577944.6 dated Nov. 25, 2022.

* cited by examiner

NEURAL BELIEF REASONER

TECHNICAL FIELD

The subject disclosure relates to generative models for unsupervised learning, and more specifically, to a generative model that specifies belief functions.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating providing efficient neural networks are described.

According to an embodiment, a system can comprise a memory that stores computer executable components and a processor that executes computer executable components stored in the memory. The computer executable components can comprise a neural belief reasoner. The neural belief reasoner can comprise a receiving component that receives a request for a belief function, a generative model component comprising one or more neural networks trained on observations, wherein the generative model component processes the request for the belief function based on trained probability parameters and a minimization function to determine a generalized belief function defined by fuzzy sets, and a belief function output component that outputs data corresponding to the generalized belief function.

According to another embodiment, a computer-implemented method is provided. The computer-implemented method can comprise receiving, by a device operatively coupled to a processor, a request for a belief function, and processing, by the device, the request for the belief function in a generative model based on trained probability parameters and a minimization function to determine a generalized belief function defined by fuzzy sets. The computer-implemented method can further comprise outputting, by the device, data corresponding to the generalized belief function.

According to yet another embodiment, a computer program product for facilitating a neural belief reasoner and comprising one or more computer readable storage media having program instructions embodied therewith is provided. The program instructions are executable by a processing component to cause the processor to: receive a request for a belief function; and process the request for the belief function in a generative model based on trained probability parameters and a minimization function to determine a generalized belief function defined by fuzzy sets. The program instructions are also executable to cause the processor to output data corresponding to the generalized belief function.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The technology described herein is directed towards a neural belief reasoner comprising a generative model for unsupervised learning. As will be understood, the neural belief reasoner specifies belief functions, thereby modeling epistemic uncertainty, unlike other generative models that specify probability distributions. Moreover, the neural belief reasoner facilitates the automatic discovery of rules/relations.

Figure 1:
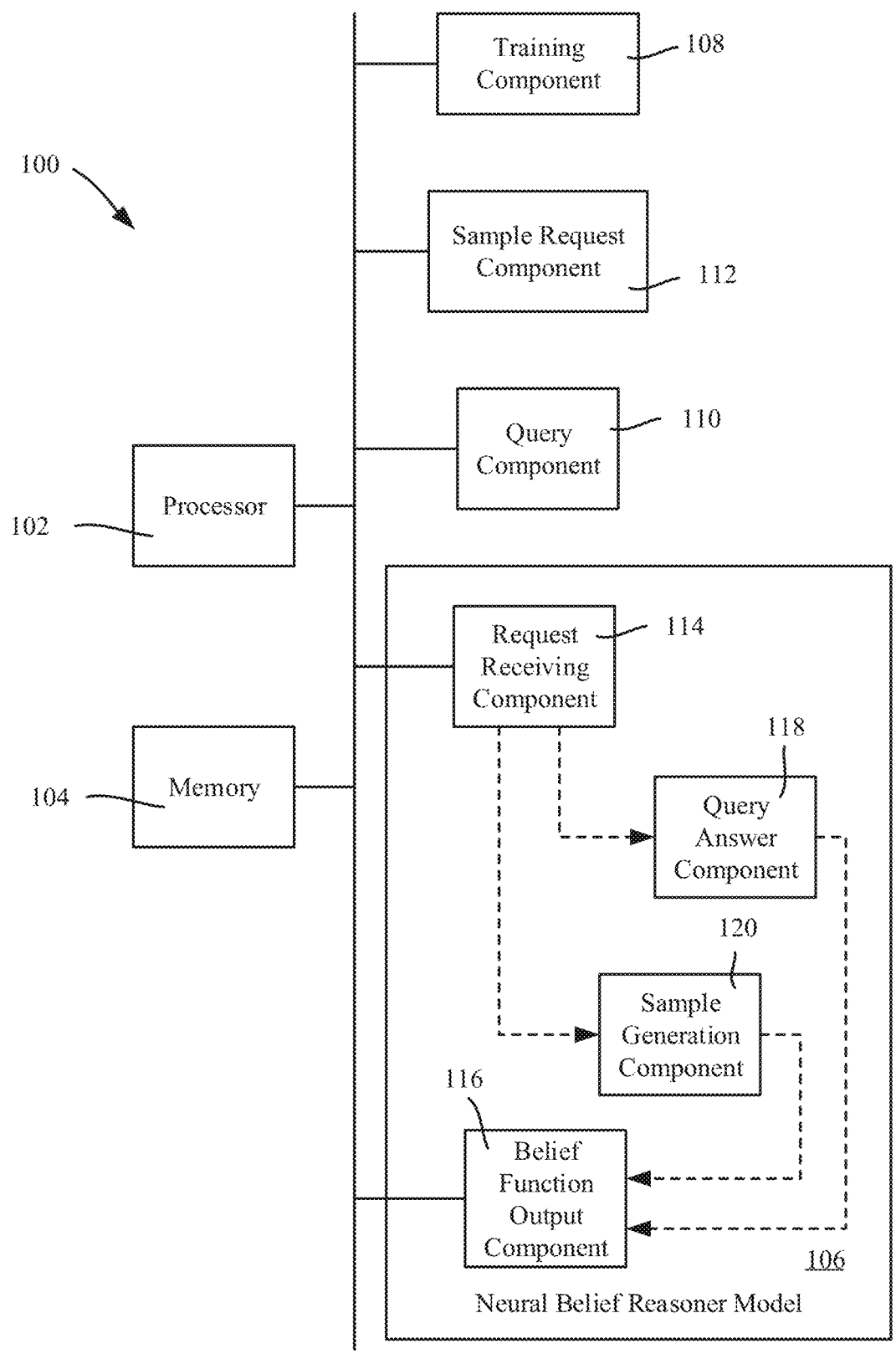
FIG. 1 is a block diagram of an example, non-limiting system that illustrates various aspects of the technology in accordance with one or more embodiments described herein.

FIG. 1 shows example components of a system 100 including a processor 102 and memory 104 along with components that comprise or operate with a neural belief reasoner model 106. In general and as described herein, a training component 108 trains the neural belief reasoner model 106 based on observations.

Once trained, the neural belief reasoner model 106 can perform various tasks, including responding with answers to queries received from a query component 110 and/or responding with samples with respect to requests for samples from a sample request component 112. As is understood, the responses comprise belief functions/data corresponding to belief functions, e.g., a belief value and a plausibility value.

To this end, the neural belief reasoner model 106 comprises a request receiving component 114 and a belief function output component 116. Depending on what is requested, a query answer component 118 or a sample generation component 120 is invoked to provide the requested output data. Note that a neural belief reasoner model can typically output answer data and sample data, and if so, the request receiving component 114 can route the request to the query answer component 118 or the sample generation component 120 as appropriate; however it is alternatively feasible to have a neural belief reasoner model that is dedicated to answering questions or generating sample data, but not both.

Figure 2:
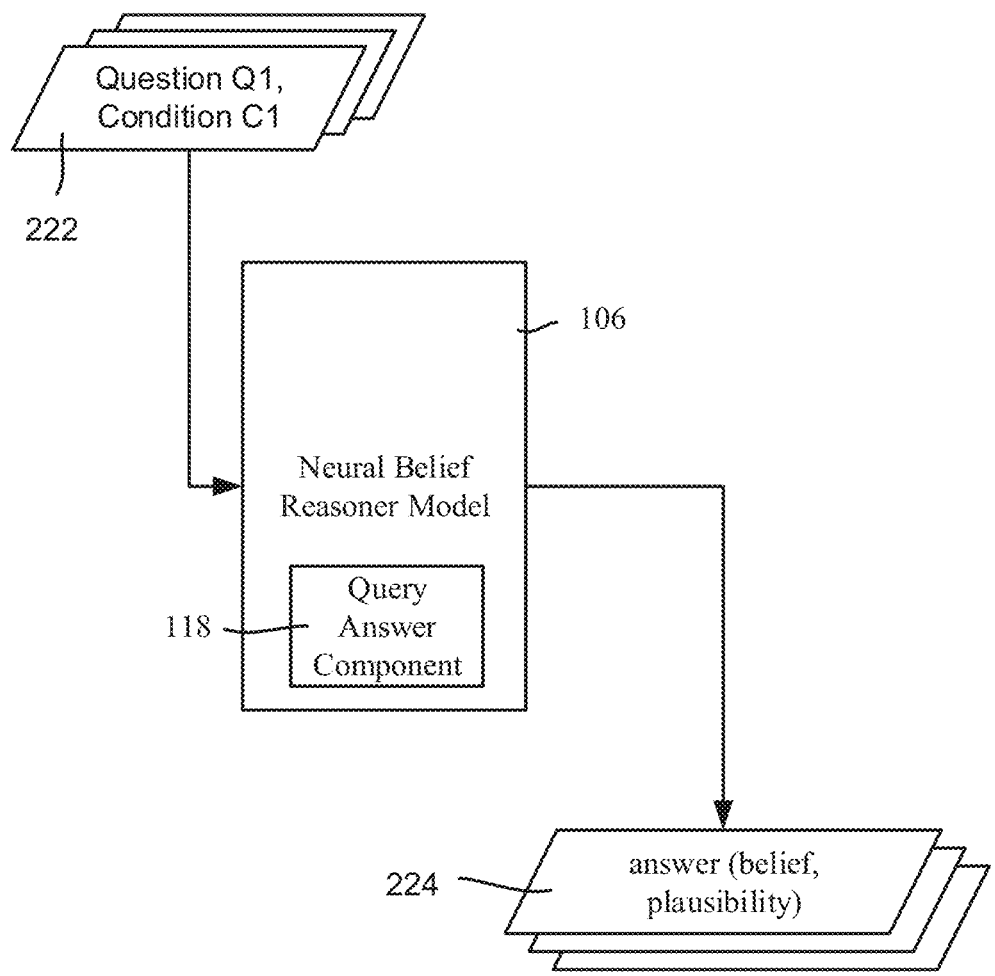
FIG. 2 illustrates a block diagram representing example components corresponding to the various technical aspects of FIG. 1 comprising a query answer component of a neural belief reasoner model that is directed to answering questions with a belief function in accordance with one or more embodiments described herein.

FIG. 2 summarizes how the query answer component 118 of the neural belief reasoner model 106 generally operates in one or more implementations. Repetitive description of like elements employed in other embodiments described herein is omitted for sake of brevity. Given a condition C, assumed to be true, the input 222 to the neural belief reasoner model 106 also provides a proposition/question Q. By way of example, a condition can be "if the company earnings report shows profits >J" and a question can be "is this company's stock going to go up?" (where J is some monetary value, a percentage or the like). As is understood, the output 224 comprises a belief and plausibility with respect to whether Q1 is true.

A neural belief reasoner model is based on a Function x=F(z) where x is a vector representing the observation variables and vector z represents the latent variables. The neural belief reasoner model is also based on a Function r=R(z) in which entries of vector r are in the range [0, 1]. The neural belief reasoner model is also based on Bernoulli variables $Y_1, Y_2, \ldots, Y_K$, where K is the dimension of the vector r.

In practice, the F and R functions can be implemented by neural networks, and these neural networks can overlap each other. The parameters of a neural belief reasoner model are $\theta_F$, which are the parameters for the function F, $\theta_R$, which are the parameters for the function R, and $b_i = P_{Y_i}(1)$ for i=1, 2, ..., K.

A neural belief reasoner model describes a generalized belief function over z space, which is specified by the following mass assignment function:

$$m(S_{y_1,\ldots,y_K}) = \frac{\prod_{i=1}^{K} P_{Y_i}(y_i) \cdot \max_z \left( \min_{i=1}^{K}(y_i \cdot r_i + 1 - y_i) \right)}{E\left[ \max_z \left( \min_{i=1}^{K}(Y_i \cdot r_i + 1 - Y_i) \right) \right]}, \quad (1)$$

$$\forall y_1, \ldots, y_K \in \{0, 1\}$$

where $S_{y_1,\ldots,y_K}$ is a fuzzy set in z space with the following membership function:

$$\mu_{y_1,\ldots,y_K}(z) = \min_{i=1}^{K}(y_i \cdot r_i + 1 - y_i). \quad (2)$$

The above mass assignment functions and corresponding belief functions by the neural belief reasoner are different and generalized from their classical definitions in that they are defined on fuzzy sets instead of classical sets. Further defined herein is the following mapping from a mass assignment function to a belief function: for any set A, $$Bel(A) = \sum_S m(S) \cdot \left( 1 - \frac{\max_z(\min(1 - \mu_A(z), \mu_S(z)))}{\max_z(\mu_S(z))} \right) \quad (3)$$

It is straightforward to verify that, if all sets involved are classical sets, equation (3) becomes the classical mapping from a mass assignment function to a belief function.

Because x is a deterministic function of z, a neural belief reasoner model also specifies a generalized belief function over x space.

Equation (1) uses Dempster's rule of combination in the following sense. If the R function only outputs 0 or 1, then equation (2) becomes a classical set and equation (1) becomes an instance of Dempster's rule. However, while Dempster's rule is used herein, note that Dempster's rule is not a requirement for the neural belief reasoner. For example, given a different rule of combination, the neural belief reasoner can adapt by modifying equation (1) and so on to become consistent with the given rule.

As will be understood, the neural belief reasoner model can be used to answer queries and generate samples. Further, the neural belief reasoner model can be trained from unlabeled observations.

With respect to query answering, the most general form of a query is to request a belief function over q=Q(z) given a condition function C(z), where Q is a deterministic vector-output function and C is a function that outputs a scalar in the range of [0, 1]. For example, q can be a subset of x; C(z) can be 1 if another subset of x takes certain values and 0 otherwise, or C can be a smoother function. A general way to answer a query is to take C as an additional entry in R, while its corresponding Y variable is always 1. The mass assignment function over z space under condition C is:

$$m(S_{y_1,\ldots,y_K}) = \frac{\prod_{i=1}^{K} P_{Y_i}(y_i) \cdot \max_z \left( \min\left( \min_{i=1}^{K}(y_i \cdot r_i + 1 - y_i), C(z) \right) \right)}{E\left[ \max_z \left( \min\left( \min_{i=1}^{K}(Y_i \cdot r_i + 1 - Y_i), C(z) \right) \right) \right]}, \quad (4)$$

$$\forall y_1, \ldots, y_K \in \{0, 1\}$$

where $S_{y_1,\ldots,y_K}$ is a fuzzy set in z space with the following membership function:

$$\mu_{y_1,\ldots,y_K}(z) = \min\left( \min_{i=1}^{K}(y_i \cdot r_i + 1 - y_i), C(z) \right). \quad (5)$$

Because q is a deterministic function of z, the belief function over q space under condition C can be computed from equation (4).

The above general method is often unnecessarily expensive. A simplified alternative is described which works for a type queries that are often encountered in practice, namely the dimension of q is 1, and both Q and C only output 0 or 1. In other words, given two classical non-fuzzy logic formulas Q and C, the process computes the belief and plausibility of Q under the condition that C is true:

$$Bel(Q(z) | C(z)) = 1 - \frac{E\left[\max_{z|C(z)=1,Q(z)=0}\left(\min_{i=1}^{K}(Y_i \cdot r_i + 1 - Y_i)\right)\right]}{E\left[\max_{z|C(z)=1}\left(\min_{i=1}^{K}(Y_i \cdot r_i + 1 - Y_i)\right)\right]} \quad (6)$$

$$Pl(Q(z) | C(z)) = \frac{E\left[\max_{z|C(z)=1,Q(z)=1}\left(\min_{i=1}^{K}(Y_i \cdot r_i + 1 - Y_i)\right)\right]}{E\left[\max_{z|C(z)=1}\left(\min_{i=1}^{K}(Y_i \cdot r_i + 1 - Y_i)\right)\right]}. \quad (7)$$

Note that both equation (6) and equation (7) can be approximated by Monte Carlo when querying a neural belief reasoner with a large K.

Turning to sample generation, to generate sample observations x, described herein is combining the belief function over x space specified by the neural belief reasoner and a prior-knowledge probability distribution over x space. This prior-knowledge probability distribution represents information that is not included in the neural belief reasoner, as described herein.

For example, consider that the prior-knowledge probability distribution is a uniform distribution, which implies that all knowledge is contained in the neural belief reasoner. The combination of a belief function and a probability function over the same sample space is a probability function and therefore allows sample generation. In practice, the combination operation does not need to be explicitly performed; only the ability to draw samples from the prior-knowledge probability distribution is needed.

Thus sample are drawn from a prior-knowledge probability distribution (e.g., a uniform distribution), and for any sample the process randomly decides whether to keep it or reject it. The probability to keep a sample z drawn from the prior-knowledge distribution is:

$$P_{keep}(\tilde{x}) = E\left[\max_{z|F(z)=\tilde{x}}\left(\min_{i=1}^{K}(Y_i \cdot r_i + 1 - Y_i)\right)\right]. \quad (8)$$

There is thus a combination of the model's belief function and the prior-knowledge probability distribution. Note that the above process can generate samples from both discrete and continuous distributions, and one thus chooses the prior-knowledge probability distribution to be discrete or continuous.

Figure 3:
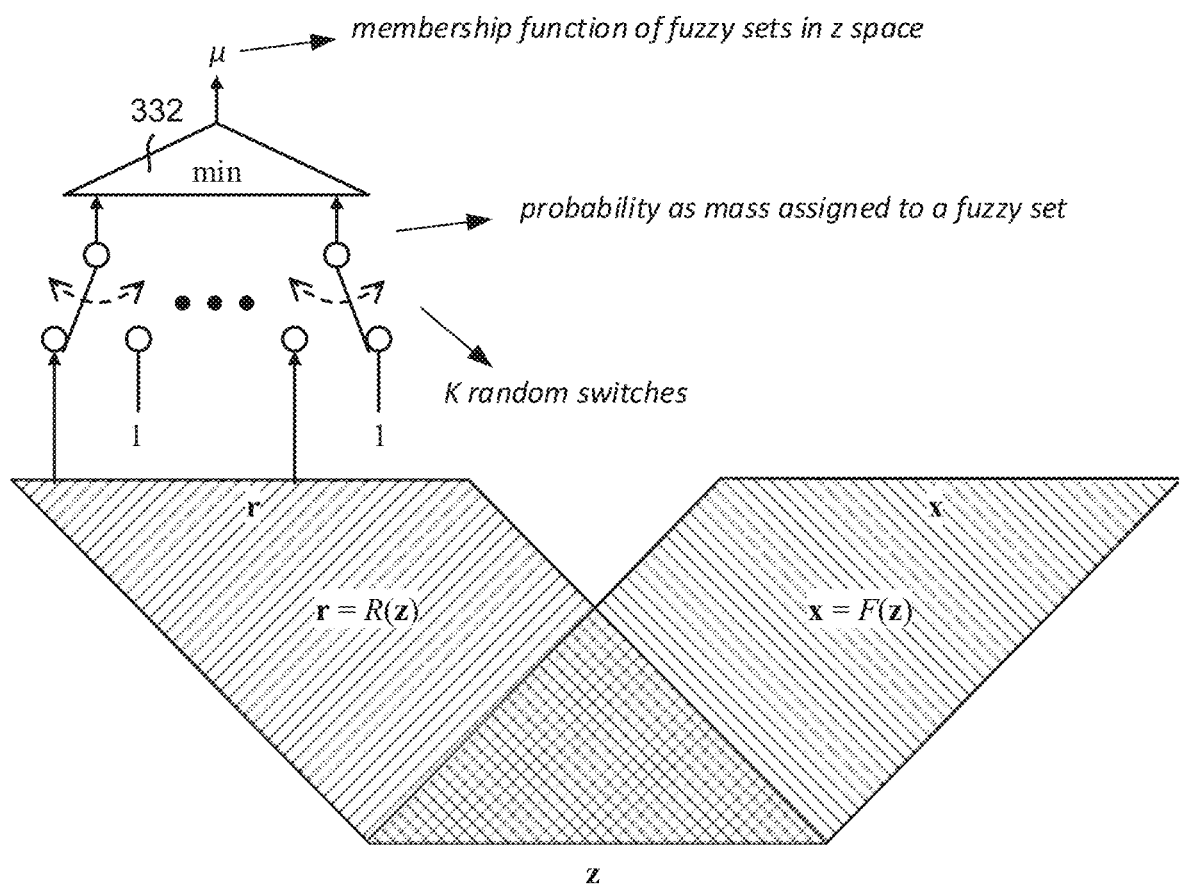
FIG. 3 is a representation of the technology described herein in the form of neural networks operating as a neural belief reasoner model, in accordance with one or more embodiments described herein.

FIG. 3 is a representation of the technology described herein in the form of vector spaces of the R and X neural networks, representing the vector space of vectors r, x and z, where "vector space" refers to all possible values of a vector. Repetitive description of like elements employed in other embodiments described herein is omitted for sake of brevity. As is understood, given some input, the R function outputs in the range from [0, 1] to random variables (corresponding to probability as mass assigned to a fuzzy set), represented in FIG. 3 as set of switches, with the switched output fed to a minimization function 332. The number of switches is the dimension of r, (vector r is a trainable deterministic function of vector z), that is, K, the width of the neural network.

The output from the minimization function is µ, the membership function of the $2^K$ fuzzy sets in z space. As is understood, this corresponds to the above equations. Note that for sample generation, conditional generation can be achieved by adding condition data to µ.

Figure 4:
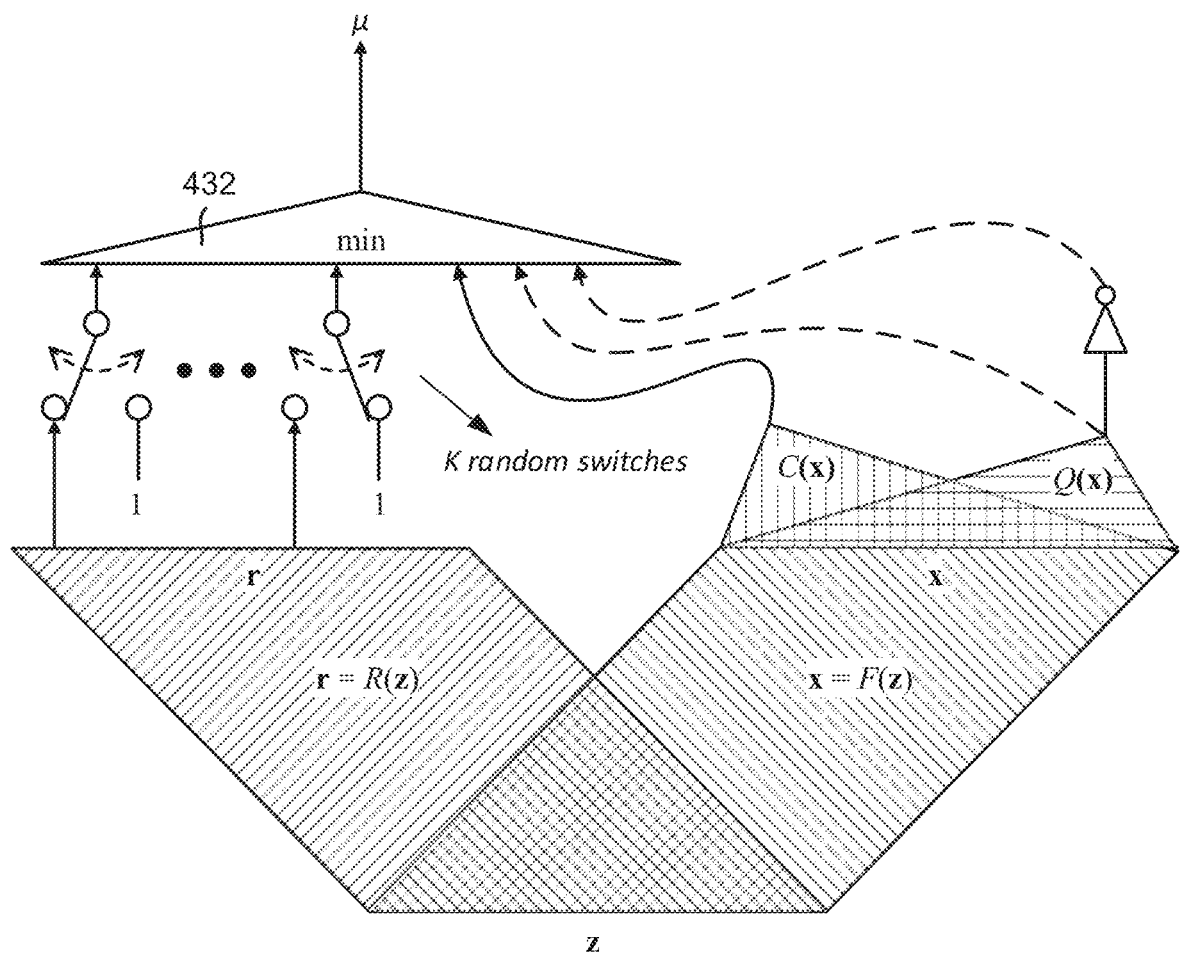
FIG. 4 is a representation of the technology described herein in the form of neural networks operating as a neural belief reasoner model that answers queries, in accordance with one or more embodiments described herein.

FIG. 4 is a more specific representation of FIG. 3 corresponding to query answering. Repetitive description of like elements employed in other embodiments described herein is omitted for sake of brevity.

Figure 5:
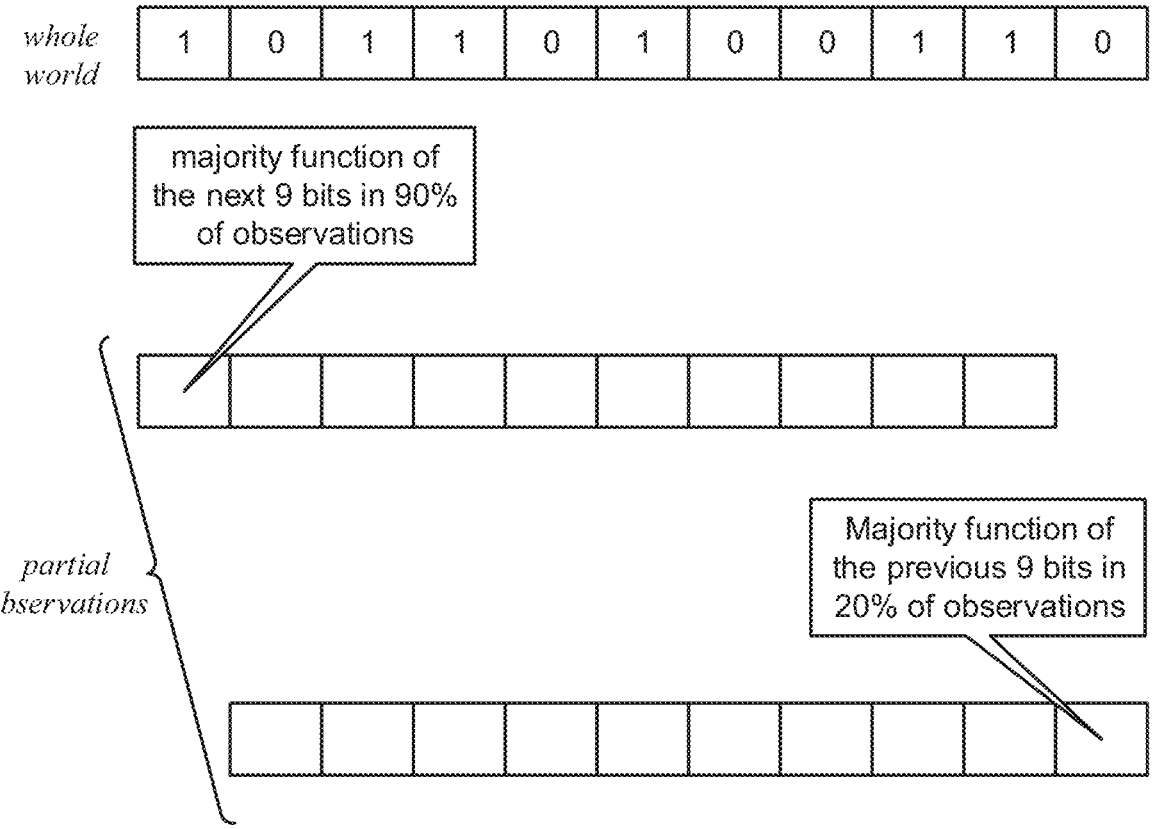
FIG. 5 illustrates an example world and partial observations therein that exemplify how a neural belief reasoner model processes information into belief functions, in accordance with one or more embodiments described herein.

The belief and plausibility values are computed by equations (6) and (7). By way of example of conditions and queries, consider a world with eleven bits as represented in FIG. 5. Partial observations are available that observe either the first ten bits or the last ten bits. In observations of first ten bits, the first bit is the majority function of the middle nine bits for ninety percent of the cases, and the inverse for ten percent of the cases. In observations of the last ten bits, the last bit is the inverse of majority function of the middle nine bits for eighty percent of the cases, and the majority function for twenty percent of the cases. A neural belief reasoner with K=2 was trained on these observations, and the following Table shows the neural belief reasoner model's answers to some actual queries; two versions are shown, one in which the training reached a global minimum and one where the training reached a local minimum.

| | | answer (belief, plausibility) | |
|---|---|---|---|
| Condition | query | global min | local min |
| $x_0 = 1$ | $x_{10}$ | 0, 0.33 | 0, 0.36 |
| $x_0 = 0$ | $x_{10}$ | 0.67, 1 | 0.60, 1 |
| $x_0 = 1, x_1 = x_2 = x_3 = x_4 = 0$ | $x_5$ | 0.89, 1 | 0.88, 1 |
| $x_0 = 1, x_1 = x_2 = x_3 = x_4 = 0, x_{10} = 1$ | $x_5$ | 0.67, 1 | 0.61, 0.99 |
| $x_0 = 1, x_1 = x_2 = x_3 = x_4 = 0, x_6 = x_7 = x_8 = x_9 = x_{10} = 1$ | $x_5$ | 0.67, 0.75 | 0.62, 0.81 |

As can be seen, the answers in the above Table are qualitatively consistent with human intuitions, and the numerical values are consistent with human intuitions on a relative basis (although with actual mathematical belief and plausibility values in the answer). Note that the neural belief reasoner had never seen an observation that simultaneously shows $x_0$ and $x_{10}$, and the neural belief reasoner answers the first two queries by performing multi-hop reasoning with uncertainty. The last two queries further demonstrate the neural belief reasoner's ability to reason about conflicting information, in this case $x_0=1$ and $x_{10}=1$. These data also show that it is not a requirement to train a neural belief reasoner to perfection and a local minimum can provide sensible answers.

With respect to training, in general, training operates to improve the parameters, based on a full view or partial view of observations. Inputs to the training process of a neural belief reasoner thus can include unlabeled, possibly partial, observations of x and a prior-knowledge probability distribution over x space. In general, training maximizes the likelihood of the observations in the sample generation process. Partial observations are allowed in the training data, with a corresponding (more complex) loss function. An alternative is adversarial training.

The prior-knowledge distribution defines what needs to be learned by the neural belief reasoner, namely information that is present in the observations yet that is beyond what is already encoded in the prior-knowledge distribution. For example, if the prior knowledge is only the range of x, a uniform prior-knowledge distribution can be used. As another example, if the prior knowledge is the mean and variance of x, a Gaussian prior-knowledge distribution can be used. As yet another example, if there already is a neural belief reasoner model for x, samples generated by the existing the neural belief reasoner as described herein as the prior-knowledge distribution can be used; thereafter the training operations operate to train a new, second neural belief reasoner which contains (and only contains) knowledge that is beyond the existing neural belief reasoner. Note that, once a neural belief reasoner is trained, the query answering process described herein is independent of the prior-knowledge distribution that has been used in training. In other words, the query answering operations provide answers that are based on only the knowledge contained in the neural belief reasoner, and do not utilize prior knowledge that may have existed during training.

For the above-described example of training a second neural belief reasoner, to obtain an informed answer to a query based on all available evidence, equations (6) and (7) are evaluated for both the neural belief reasoners, with the two resulting belief functions combined into a single final one belief function. By the sample generation process described herein a neural belief reasoner can be used to generate samples based on a prior-knowledge distribution that is different from the one from which the neural belief reasoner was trained. This separation of knowledge in the neural belief reasoner is a useful property, in that, for example, knowledge learned from one circumstance becomes transferable and usable to answer queries or generate samples in a different circumstance.

There are various ways to train a neural belief reasoner, including a maximum-likelihood method and an adversarial-training method. With respect to the maximum-likelihood method, if the training data are all complete observations of x, a neural belief reasoner can be trained by maximizing the likelihood of the observations in the sample generation process described herein.

Let X denote a vector of random variables according to the distribution of x in the prior-knowledge distribution. After removing some constant terms, the maximum-likelihood loss function is:

$$\mathcal{L} = -\frac{1}{n}\sum_{i=1}^{n} \log P_{keep}(x_i) + \log E[P_{keep}(X)] \quad (9)$$

Note that the second term in equation (9) can be approximated by Monte Carlo and doing so requires only the ability to draw samples from the prior-knowledge distribution. If the training data include partial observations of x, the loss function needs to consider the likelihood of partial observations. It is straightforward to see that computing marginal likelihood from full samples of x can be prohibitive. A more efficient approach is to base the likelihood on a sample generation process that is similar to that described above but that generates partial samples of x.

For a partial observation $x_i$, let $X_i$ denote a subset of X that corresponds to the entries observed by $x_i$, and let $U_i$ be the sample space for $X_i$. Described below are sample generation processes.

As one sample generation process, for $u \in U_i$, let $S_u$ be a set in x space which contains all x vectors that can be observed as u. Define a prior-knowledge belief function over x space such that $m(S_u) = P_{X_i}(u)$ for any $u \in U_1$, and combine this belief function with the belief function over x space specified by the neural belief reasoner. The marginal distribution over $U_i$ of the resulting belief function is guaranteed to be a probability function and therefore allows sample generation. As described above, in practice $X_i$ samples are drawn, and for any sample randomly decide whether to keep it or reject it. Let $P_{keep,a}(\tilde{x})$ denote the probability to keep a partial sample $\tilde{x}$.

As another sample generation process, convert the belief function over x space specified by the neural belief reasoner to a belief function over $U_i$ by converting each set in x space to a set in $U_i$: for any such set pair and any $u \in U_i$, $\mu_{converted}(u) = \min(\mu_{original}(x) | x$ can be observed as $u)$. The converted belief function over $U_i$ can be combined with the prior-knowledge probability distribution of $X_i$, and the sample generation process is as described above with reference to equation (8). Let $P_{keep,b}(\tilde{x})$ denote the probability to keep a partial sample $\tilde{x}$.

The above two sample generation processes compute two different likelihood values for a partial observation while computing the same value for a complete observation. A weighted average of the two can be taken in the loss function. After removing some constant terms, the loss function is:

$$\mathcal{L} = \gamma \cdot \sum_{i=1}^{n}(-\log P_{keep,a}(x_i) + \log E[P_{keep,a}(X_i)]) + \quad (10)$$

$$(1-\gamma) \cdot \sum_{i=1}^{n}(-\log P_{keep,b}(x_i) + \log E[P_{keep,b}(X_i)])$$

where γ is a hyperparameter. Note that this loss function can be computationally expensive if every $X_i$ is different. However in actual applications, the number of distinct $X_i$'s is likely far less than the number of observations, and therefore the cost of computing and differentiating the expectation terms gets amortized.

While the above describes a maximum-likelihood method of training a neural belief reasoner, other ways are feasible. For example, consider an alternative training method with an adversarial discriminator D. The loss function for training the neural belief reasoner is $$\mathcal{L} = -\sum_{i=1}^{n} \log Pl(x = x_i) - \sum_{i=1}^{n} \log D(x_{sample\ i}) \quad (11)$$

where $x_{sample\ i}$ is a sample generated by the process generally described herein with reference to equation (8). Note that equation (11) has an extra first term with plausibilities than a typical loss function for the generator training step in generative-adversarial-nets (GAN) works. This extra term helps ensure that the neural belief reasoner training does not suffer from mode dropping, which is typical with GAN training.

Turning to a relationship with rule-based reasoning, consider a special case of the neural belief reasoner where x and z contain only binary entries, function F is identity function, and function R outputs only 0 and 1. This special neural belief reasoner is equivalent to a set of first-order logic rules, each one being an entry in r and each one annotated with a belief value $b_i$. The belief function (e.g., corresponding to equations (1) and (3)) of this special case neural belief reasoner and its query answering process as described above are equivalent to applying Dempster's rule of combination on that set of first-order logic rules by viewing each rule as an entirely distinct body of evidence and reasoning under an open-world assumption. From this perspective, the neural belief reasoner is a new rule-base system for reasoning with uncertainty that has a number of useful features. For example, the neural belief reasoner allows rules defined on latent space, and uses a better model for uncertainty than Bayesian networks and Markov logic networks. A significant advance is the neural belief reasoner's ability to automatically discover rules from unlabeled observations. Note that the rules are annotated with a belief value but not a plausibility value; both can be annotated to build an alternative neural belief reasoner, which differ from that described above in that $Y_1, Y_2, \ldots, Y_K$ are three-valued random variables rather than Bernoulli. The expressiveness of the two the neural belief reasoners are the same. In certain scenarios the alternative neural belief reasoner can have some advantage in computational efficiency, whereas in others it has higher complexity, and is less biologically plausible.

In accordance with another aspect, namely the composability of multiple neural belief reasoners, a general way of using multiple neural belief reasoners together is to join them at the x layers. For example, let two neural belief reasoners have observation vectors $x_1$ and $x_2$ where they partially overlap. In other words, certain entries in $x_1$ and certain entries in $x_2$ are the same real-world observations. A larger neural belief reasoner can be composed by concatenating $x_1$ and $x_2$ into a new x, concatenating the two z vectors into a new z, concatenating the two r vectors into a new r, keeping the original F and R functions and Y variables unchanged, and adding a set of new entries into R with corresponding Y variables being always 1 and each of which indicating that a certain pair of entries in the new x are equal. These additional R entries enforce that overlapping observations in $x_1$ and $x_2$ are consistent in the new x, and they can be implemented as crispy-equal or soft-equal functions. Such a composed the neural belief reasoner is computationally less efficient in answering queries or generating samples than a the neural belief reasoner with no duplicate observations, and there is therefore a balance with respect to training cost, inference cost, and the need for dynamic composition in a given application. To help remedy these inefficiencies, if a composed the neural belief reasoner is expected to be in use for an extended amount of time, one may train an equivalent the neural belief reasoner with no duplicate observation and do so starting from the composed the neural belief reasoner, possibly with less training cost. If two the neural belief reasoners are expected to be often used jointly, one can choose topologies for their respective F functions and coordinate their training such that their common observations are encoded identically on their respective z layers, and such two neural belief reasoners can be combined compactly by removing duplicated entries in z and x and with no need for additional R entries to enforce consistent observations. From this perspective, any neural belief reasoner can be viewed as a composition of K neural belief reasoners, each of which having only one entry in R and all of which have consistent encoding between z and x.

Consider a special case of neural belief reasoner composition where the component neural belief reasoners include multiple instances of a same neural belief reasoner. Note that these multiple instances need to map x differently to real-world observations. This is similar to applying a first-order logic rule in propositional logic and to applying a same filter across a layer in a convolutional neural network. A key consideration is whether the multiple instances of a same neural belief reasoner should share Y variables. The answer is that some Y variables should be shared, which represent global uncertainty, while others should not, which represent entirely distinct bodies of evidence. In practice different instances of an R entry with unshared Y should relate to different real-world observations. In an application where a neural belief reasoner needs to be trained with both shared and unshared Y variables, the training needs to be done not over isolated observations, but over observations where the loss function is measured by the neural belief reasoner composition(s). Reinforcement learning applications, planning tasks in particular, can be formulated as an optimization problem with the neural belief reasoner. A neural belief reasoner, most likely a composed one, serves as a model of the environment, which may be unfolded in time. A policy can be formulated as a logic formula C, success can be formulated as a logic formula Q, seeking a C that maximizes equations (6) or (7), or a certain combination of the two.

Figure 6:
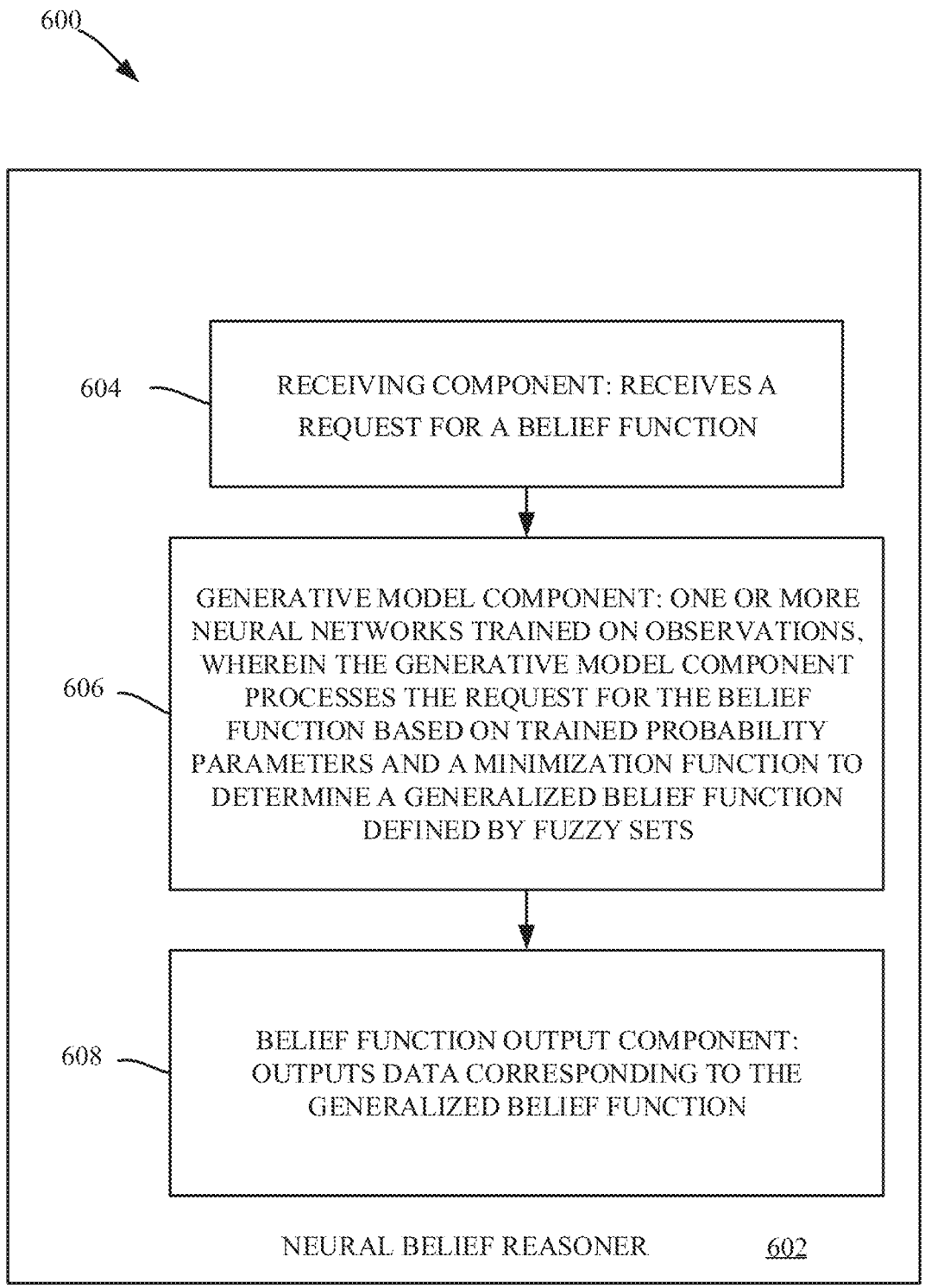
FIG. 6 illustrates a block diagram of an example, non-limiting system that facilitates a neural belief reasoner model in accordance with one or more embodiments described herein.

FIG. 6 is a representation of an example system 600, which can comprise a memory that stores computer executable components and a processor that executes computer executable components stored in the memory. Repetitive description of like elements employed in other embodiments described herein is omitted for sake of brevity.

The computer executable components can comprise a neural belief reasoner (block 602), which can comprise a receiving component that receives a request for a belief function (block 604). Other components can comprise a generative model component (block 606), comprising one or more neural networks trained on observations, wherein the generative model component processes the request for the belief function based on trained probability parameters and a minimization function to determine a generalized belief function defined by fuzzy sets that generates a query representation, and a belief function output component (block 608) that outputs data corresponding to the generalized belief function.

The receiving component that receives a request for a belief function can receive a condition function in association with a query, and the belief function output component can output the generalized belief function comprising a belief value and plausibility value as an answer to the query. The receiving component can receive a prior-knowledge probability distribution over observations, and the generative model component can combine the prior-knowledge probability distribution with the generalized belief function to generate sample observations for output by the belief function output component. The receiving component can receive a prior-knowledge probability distribution over observations, and the generative model component can draw a sample observation from the prior-knowledge probability distribution, and determine whether to keep the sample observation or reject the sample observation based on a probability computation to generate sample observations for output by the belief function output component.

The generative model component can specify the generalized belief function over a space based on a mass assignment function, wherein the mass assignment function can assign mass values, which are derived from trained probability parameters, to fuzzy sets, which are formed by trained neural networks as membership functions.

A training component can input a prior-knowledge probability distribution and unlabeled observation variables, and can use the prior-knowledge probability distribution and unlabeled observation variables to train the neural belief reasoner.

The generative model component can input unlabeled observation variables, and automatically discover rules from the unlabeled observation variables.

Figure 7:
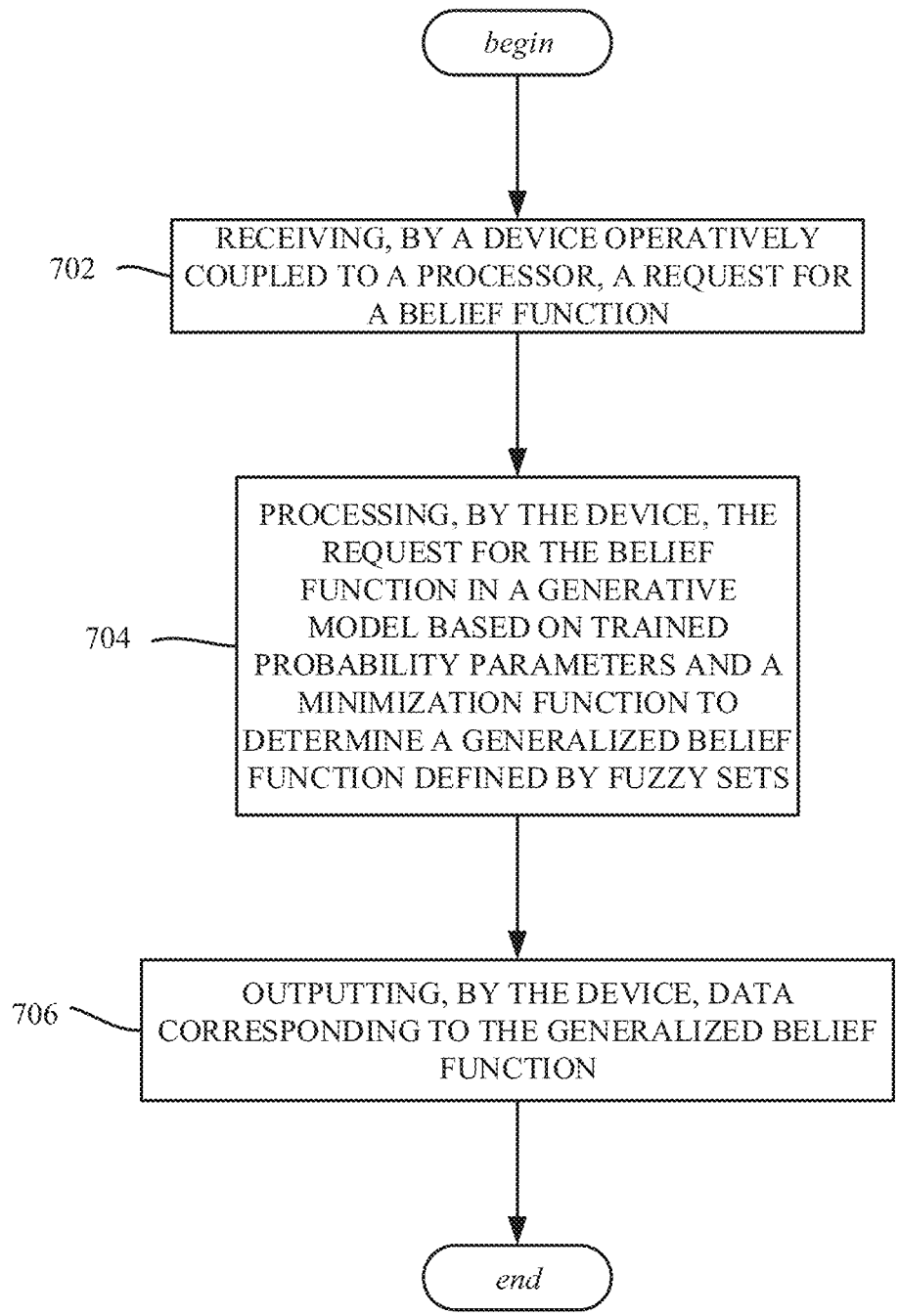
FIG. 7 illustrates a flow diagram of an example, non-limiting computer-implemented method in accordance with one or more embodiments described herein.

FIG. 7 exemplifies example operations of a computer-implemented method, comprising, receiving, e.g., by the request receiving component 114, a request for a belief function (operation 702), and processing the request for the belief function in a generative model (e.g., via the query answer component 118 and/or sample generation component 120 of the neural belief reasoner mode 106) based on trained probability parameters and a minimization function to determine a generalized belief function defined by fuzzy sets (operation 704). Operation 706 represents outputting data corresponding to the generalized belief function (via the belief function output component 116).

Receiving the request for the belief function can comprise receiving a condition function in association with a query, and outputting the data corresponding to the generalized belief function can comprise outputting a belief value and plausibility value as an answer to the query.

Receiving the request for the belief function can comprise receiving a prior-knowledge probability distribution over observations, and aspects can comprise combining the prior-knowledge probability distribution with the generalized belief function to generate sample observations for output by the belief function output component. Receiving the request for the belief function can comprise receiving a prior-knowledge probability distribution over observations, and aspects can comprise drawing a sample observation from the prior-knowledge probability distribution, and determining whether to keep the sample observation or reject the sample observation based on a probability computation to generate sample observations for outputting as data corresponding to the generalized belief function.

Aspects can comprise specifying the generalized belief function over a space based on a mass assignment function, wherein the mass assignment function can assign mass values, which are derived from trained probability parameters, to fuzzy sets, which are formed by trained neural networks as membership functions.

Aspects can comprise training the generative model, comprising inputting a prior-knowledge probability distribution and unlabeled observation variables corresponding to observations, and using the prior-knowledge probability distribution and unlabeled observation variables to maximize the likelihood of the observations.

Aspects can comprise inputting unlabeled observation variables, and automatically discovering rules from the unlabeled observation variables.

Figure 8:
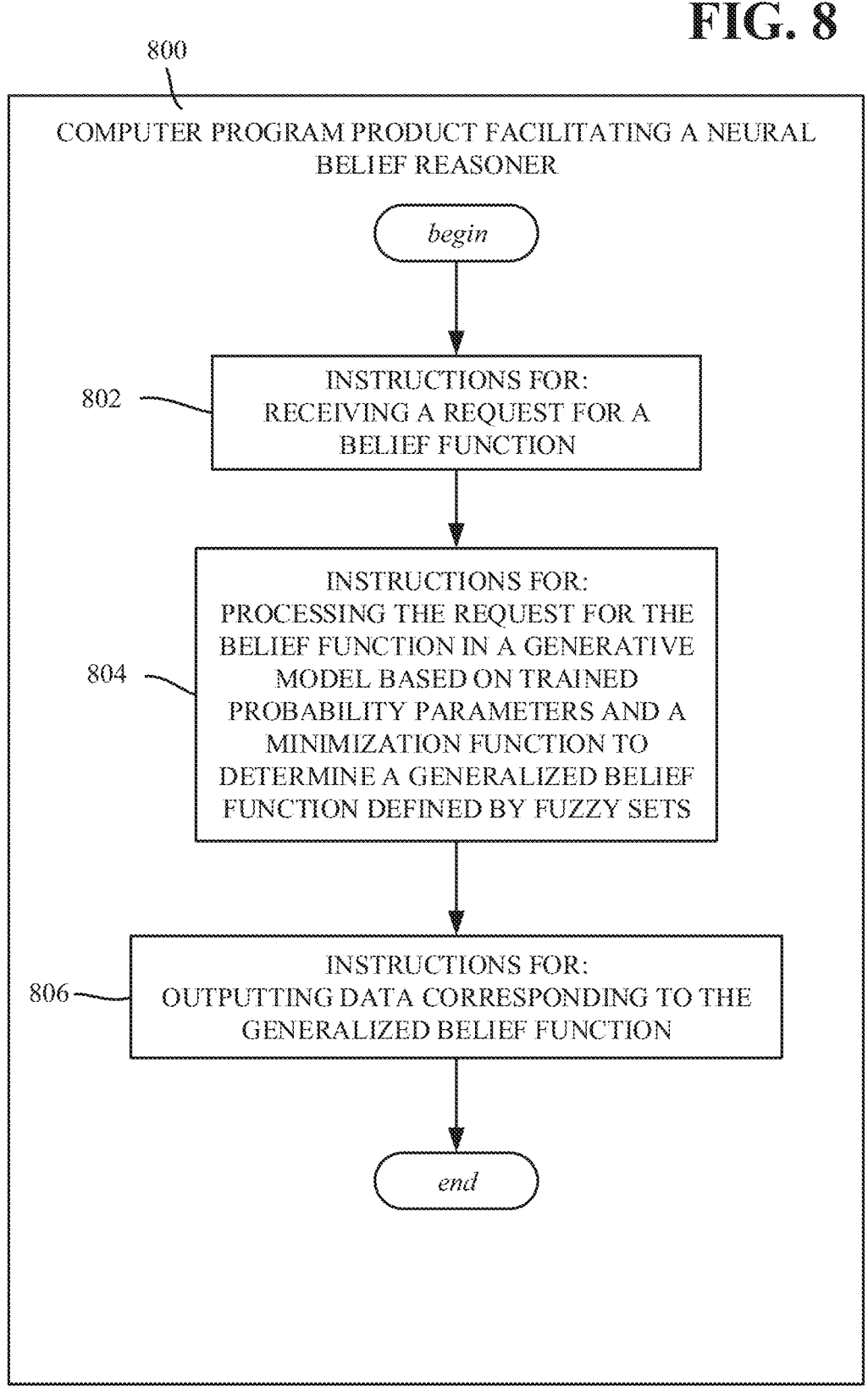
FIG. 8 illustrates a diagram of an example, non-limiting computer-program product facilitating a neural belief reasoner model in accordance with one or more embodiments described herein.

FIG. 8 exemplifies a computer program product facilitating a neural belief reasoner 800, in which the computer program product comprises a computer readable storage medium having program instructions embodied therewith. The program instructions can be executable by a processor, and can include instructions to cause the processor to perform operations. The operations can include: receiving (block 802) a request for a belief function. Other instructions can comprise cause the processor to process (block 804) the request for the belief function in a generative model based on trained probability parameters and a minimization function to determine a generalized belief function defined by fuzzy sets. Other instructions can cause the processor to output (block 806) data corresponding to the generalized belief function.

Receiving the request for the belief function can comprise receiving a condition function in association with a query, and outputting the data corresponding to the generalized belief function can comprise outputting a belief value and plausibility value as an answer to the query.

Receiving the request for the belief function can comprise receiving a prior-knowledge probability distribution over observations, and aspects can comprise combining the prior-knowledge probability distribution with the generalized belief function to generate sample observations for output by the belief function output component. Receiving the request for the belief function can comprise receiving a prior-knowledge probability distribution over observations, and aspects can comprise drawing a sample observation from the prior-knowledge probability distribution, and determining whether to keep the sample observation or reject the sample observation based on a probability computation to generate sample observations for outputting as data corresponding to the generalized belief function.

Aspects can comprise training the generative model, comprising inputting a prior-knowledge probability distribution and unlabeled observation variables corresponding to observations, and using the prior-knowledge probability distribution and unlabeled observation variables to maximize the likelihood of the observations.

Aspects can comprise inputting unlabeled observation variables, and automatically discovering rules from the unlabeled observation variables.

As can be seen, there is described herein a neural belief reasoner comprising a generative model for unsupervised learning. The neural belief reasoner specifies a belief function, rather than a probability distribution, and can be trained on unlabeled (including partial) observations. The neural belief reasoner provides for query answering, e.g., belief and plausibility of a proposition conditioned on another, data generation including conditional data generation, and the automatic discovery of rules/relations. Example applications include dialog systems, document classification and retrieval, expert systems including knowledge acquisition, and other tasks.

Figure 9:
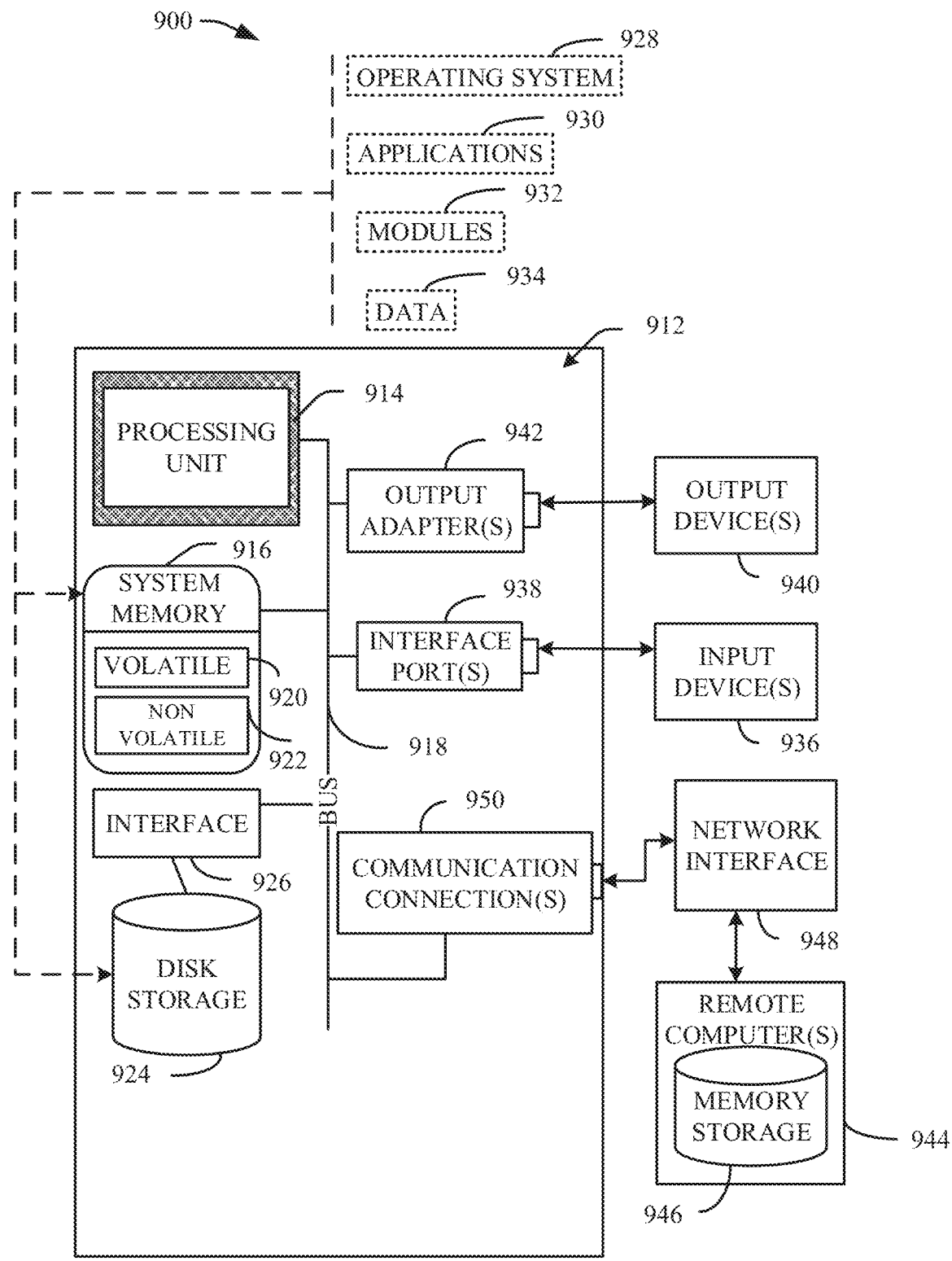
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory that stores computer executable components; and
    a processor that executes computer executable components stored in the memory, wherein the computer executable components comprise:
        a neural belief reasoner comprising:
            a receiving component that receives a request for a belief function;
            a generative model component comprising two or more neural networks trained on observations, wherein a first neural network and a second neural network of the two or more neural networks overlap, that operates as a set of first-order logic rules, wherein the generative model component processes the request for the belief function based on trained probability parameters and a minimization function comprising a set of random switches wherein an amount of random switches in the set of random switches is a function of the second neural network to determine a generalized belief function defined by fuzzy sets, and discovers rules for use in a rule-based system from unlabeled observation variables, wherein the rules are annotated with a belief value, and wherein the first neural network maps latent variables to observations and the second neural network maps latent variables to vectors; and
            a belief function output component that outputs data corresponding to the generalized belief function.

2. The system of claim 1, wherein the receiving component that receives the request for the belief function receives a condition function in association with a query, and wherein the belief function output component outputs the data corresponding to the generalized belief function comprising a belief value and plausibility value as an answer to the query.

3. The system of claim 1, wherein the receiving component receives a prior-knowledge probability distribution over observations, and wherein the generative model component combines the prior-knowledge probability distribution with the generalized belief function to generate sample observations for output by the belief function output component.

4. The system of claim 1, wherein the receiving component receives a prior-knowledge probability distribution over observations, and wherein the generative model component draws a sample observation from the prior-knowledge probability distribution, and determines whether to keep the sample observation or reject the sample observation based on a probability computation to generate sample observations for output by the belief function output component, wherein the probability computation is based on the belief function and the prior-knowledge probability distribution.

5. The system of claim 1, wherein the generative model component specifies the generalized belief function over a space based on a mass assignment function, and wherein the mass assignment function assigns mass values, which are derived from trained probability parameters, to fuzzy sets, which are formed by trained neural networks as membership functions.

6. The system of claim 1, further comprising:
a training component that inputs a prior-knowledge probability distribution and the unlabeled observation variables, and uses the prior-knowledge probability distribution and the unlabeled observation variables to train the neural belief reasoner.

7. The system of claim 1, wherein the generative model component inputs the unlabeled observation variables.

8. A computer-implemented method comprising:
receiving, by a device operatively coupled to a processor, a request for a belief function;
processing, by the device, the request for the belief function in a generative model comprising a first neural network and second neural network that overlap, that operates as a set of first-order logic rules, trained based on trained probability parameters and a minimization function comprising a set of random switches wherein an amount of random switches in the set of random switches is a function of the second neural network to determine a generalized belief function defined by fuzzy sets, wherein the first neural network maps latent variables to observations and the second neural network maps latent variables to vectors;
discovering, by the device, rules for use in a rule-based system from unlabeled observation variables, wherein the rules are annotated with a belief value; and
outputting, by the device, data corresponding to the generalized belief function.

9. The computer-implemented method of claim 8, wherein the receiving the request for the belief function comprises receiving a condition function in association with a query, and wherein the outputting data corresponding to the generalized belief function comprises outputting the belief value and plausibility value as an answer to the query.

10. The computer-implemented method of claim 8, wherein the receiving the request for the belief function comprises receiving a prior-knowledge probability distribution over observations, the computer-implemented method further comprising:
combining, by the device, the prior-knowledge probability distribution with the generalized belief function to generate sample observations for output as the data corresponding to the generalized belief function.

11. The computer-implemented method of claim 8, wherein the receiving the request for the belief function comprises receiving a prior-knowledge probability distribution over observations, the computer-implemented method further comprising:
drawing, by the device, a sample observation from the prior-knowledge probability distribution; and
determining, by the device, whether to keep the sample observation or reject the sample observation based on a probability computation to generate sample observations for outputting as data corresponding to the generalized belief function.

12. The computer-implemented method of claim 8, further comprising:
specifying, by the device, the generalized belief function over a space based on a mass assignment function, wherein the mass assignment function assigns mass values, which are derived from trained probability parameters, to fuzzy sets, which are formed by trained neural networks as membership functions.

13. The computer-implemented method of claim 8, further comprising:
training, by the device, the generative model, comprising inputting a prior-knowledge probability distribution and the unlabeled observation variables corresponding to observations, and using the prior-knowledge probability distribution and the unlabeled observation variables to maximize a likelihood of the observations.

14. The computer-implemented method of claim 8, further comprising:
inputting, by the device, the unlabeled observation variables.

15. A computer program product for facilitating a neural belief reasoner, the computer program product comprising one or more computer readable storage media having program instructions embodied therewith, the program instructions executable by a processing component to cause the processor to:
receive, by the processor, a request for a belief function;
process, by the processor, the request for the belief function in a generative model comprising a first neural network and a second neural network that overlap, that operates as a set of first-order logic rules, based on trained probability parameters and a minimization function comprising a set of random switches wherein an amount of random switches in the set of random switches is a function of the second neural network to determine a generalized belief function defined by fuzzy sets, wherein the first neural network maps latent variables to observations and the second neural network maps latent variables to vectors;
discover, by the processor, rules for use in a rule-based system from unlabeled observation variables, wherein the rules are annotated with a belief value; and
output data corresponding to the generalized belief function.

16. The computer program product of claim 15, wherein the receipt of the request for the belief function comprises receipt of a condition function in association with a query, and wherein the output of the data corresponding to the generalized belief function comprises output of the belief value and plausibility value as an answer to the query.

17. The computer program product of claim 15, wherein the receipt of the request for the belief function comprises receipt of a prior-knowledge probability distribution over observations, and the program instructions further executable by the processor to cause the processor to:
combine the prior-knowledge probability distribution with the generalized belief function to generate sample observations for output as the data corresponding to the generalized belief function.

18. The computer program product of claim 15, wherein the receipt of the request for the belief function comprises receipt of a prior-knowledge probability distribution over observations, and the program instructions further executable by the processor to cause the processor to:
   draw a sample observation from the prior-knowledge probability distribution; and
   determine whether to keep the sample observation or reject the sample observation based on a probability computation to generate sample observations to output as data corresponding to the generalized belief function.

19. The computer program product of claim 15, the program instructions further executable by the processor to cause the processor to:
   train the generative model, comprising an inputting of a prior-knowledge probability distribution and the unlabeled observation variables corresponding to observations, and a using of the prior-knowledge probability distribution and the unlabeled observation variables to maximize a likelihood of the observations.

20. The computer program product of claim 15, the program instructions further executable by the processor to cause the processor to:
   input the unlabeled observation variables.

\* \* \* \* \*